United States Patent
Michaels et al.

(10) Patent No.: US 6,453,167 B1
(45) Date of Patent: *Sep. 17, 2002

(54) TELECOMMUNICATIONS SYSTEMS

(75) Inventors: Wayne David Michaels, Berkshire; Anthony Richard Timson, Middlesex; Aden William Dervan, London, all of (GB)

(73) Assignee: British Technology Group Inter-Corporate Licensing, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,628

(22) Filed: Dec. 7, 1999

Related U.S. Application Data

(63) Continuation of application No. 08/557,147, filed as application No. PCT/GB94/01295 on Jun. 15, 1994, now Pat. No. 6,011,976.

(30) Foreign Application Priority Data

| | | |
|---|---|---|
| Jun. 15, 1993 | (GB) | 9312320 |
| Jul. 2, 1993 | (GB) | 9313772 |
| Jul. 8, 1993 | (GB) | 9314096 |

(51) Int. Cl.$^7$ .......................... H04Q 7/20; H04B 1/38; H04M 1/00
(52) U.S. Cl. .................... 455/466; 455/558; 455/420
(58) Field of Search ................. 455/466, 558, 455/420, 422, 425, 550, 551, 556–557, 575, 90, 186.1, 418–419, 88, 564, 70; 340/825.44, 311.1

(56) References Cited

U.S. PATENT DOCUMENTS

| | | |
|---|---|---|
| 4,523,297 A | 6/1985 | Ugon et al. |
| 4,816,654 A | 3/1989 | Anderl et al. |
| 4,839,628 A | 6/1989 | Davis et al. |

(List continued on next page.)

FOREIGN PATENT DOCUMENTS

| | | |
|---|---|---|
| EP | 0459344 A1 | 12/1991 |
| EP | 0 252 850 B1 | 9/1992 |
| EP | 0562890 A1 | 9/1993 |
| EP | 0 472 813 B1 | 12/1998 |
| FR | 2 624 679 A1 | 6/1989 |
| FR | 2 638 868 B1 | 12/1990 |
| FR | 2 673 476 A1 | 9/1992 |
| WO | WO91/12698 | 8/1991 |
| WO | WO 92/14329 A1 | 8/1992 |
| WO | WO 94/10657 A1 | 5/1994 |

OTHER PUBLICATIONS

L. Dittrich Siemens, et al; Implementation of the GSM–Data–Services Into the Mobile Radio System; Mobile Radio Conference; Nov. 13, 1991; pp. 73–83.

Guide Utilisateur de la Carte M.P. (Guide for Implementation of a Global P.M. Solution); Bull CP8–TU0167F01; Sep., 1989.

Guide de Mise en Oeuvre D'une Solution Globale M.P. (User's Guide to the P.M. Card); Bull CP8–TU0167F01; Sep., 1989.

(List continued on next page.)

*Primary Examiner*—Nguyen T. Vo
(74) *Attorney, Agent, or Firm*—Stevens & Showalter LLP

(57) ABSTRACT

In a telecommunications system such as a global mobile telephone network in which each subscriber unit includes a Subscriber Identity Module (SIM card), each SIM card has fixed memory locations (22), to which data can be addressed over the air. Some of the locations (22) can not be overwritten from the subscriber unit but can be accessed therefrom on the entry of short simple codes, each associated with one of the locations. Further fixed memory locations (24) can be read over the air only when the subscriber enters a personal identification number. Locking control files (27, 28) are used to control read/write access to the locations (22, 24) respectively.

29 Claims, 6 Drawing Sheets

U.S. PATENT DOCUMENTS

| | | | |
|---|---|---|---|
| 5,012,234 | A | 4/1991 | Dulaney et al. |
| 5,109,403 | A | 4/1992 | Sutphin |
| 5,127,040 | A | 6/1992 | D'Avello et al. |
| 5,128,981 | A | 7/1992 | Tsukamoto et al. |
| 5,179,373 | A | 1/1993 | John |
| 5,225,826 | A | 7/1993 | DeLuca et al. |
| 5,349,696 | A | 9/1994 | Matai |
| 5,353,328 | A * | 10/1994 | Jokimies ............... 455/558 |
| 5,430,892 | A | 7/1995 | Moteai |
| 5,465,401 | A | 11/1995 | Thompson |
| 5,555,446 | A | 9/1996 | Jasinski |
| 6,011,976 | A * | 1/2000 | Michaels et al. .......... 455/466 |

OTHER PUBLICATIONS

User Guide for M.P. Security Modules; Bull CP8–TU0168F01; Sep., 1989; pp. 83, 84, 88, 154, 155.

Recommendation GSM 11.11; Specification of the SIM–ME Interface; Released version Jan. 1991:3.6.0; Updated version Apr. 1991:3.7.0.

Recommendation GSM 11.11; Specification of the SIM–ME Inerface; Previously distributed version: 3.9.0 (Updated Release 1/90); New Released version Feb. 92: 3.10.0 (Release 92, Phase 1).

Echo des Recherches, Une application de la carte a microprocesseur: le module d'identite d'abonne' du radiotelephone numerique europeen, 1990, No. 139, Ier Tri., Issy/Moulineaux, FR, pp. 13–20.

* cited by examiner

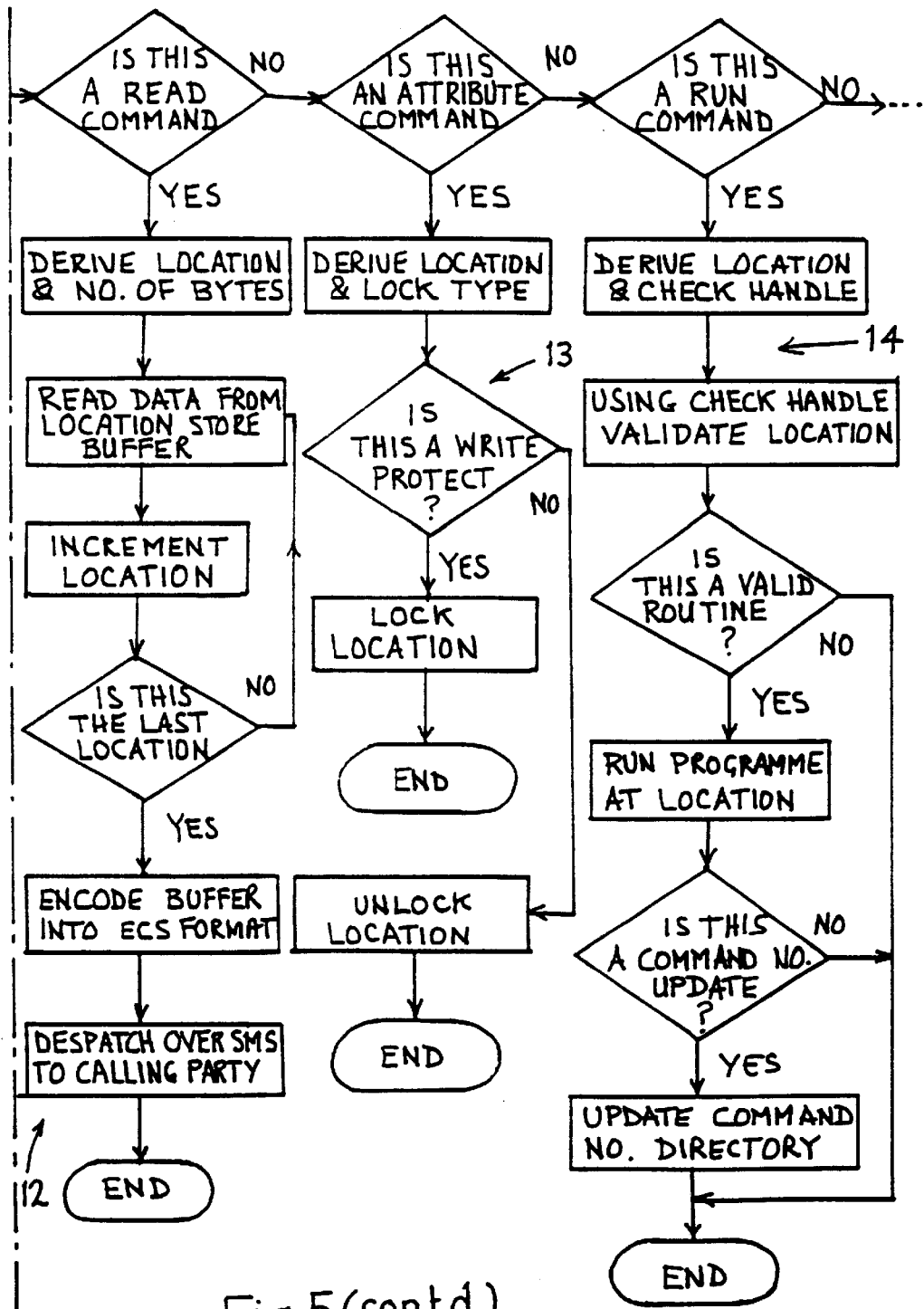
Fig.5(cont.d)

TELECOMMUNICATIONS SYSTEMS

CROSS REFERENCE TO RELATED APPLICATIONS

This application is a continuation of U.S. patent application Ser. No. 08/557,147, filed Apr. 19, 1996 now U.S. Pat. No. 6,011,976, which is the U.S. national stage of PCT/GB94/01295, filed Jun. 15, 1994.

This invention relates to a telecommunications system. In particular, but not exclusively, it relates to a mobile communications system such as a cellular mobile radio or telephone system.

A recent innovation in such systems has been the introduction of Subscriber Identity Modules (SIM cards). These are integrated circuit cards which can be releasably inserted into a mobile telephone and which contain in memory the subscriber's identity, i.e. his telephone number. These known SIM cards also have a rolling buffer which can store a certain number of alphanumeric characters. The buffer facilitates the so-called Short Message Service (SMS) in which a message for a subscriber or for a specified group of subscribers can be broadcast over the air, as an advanced form of radiopaging. Messages can be received by a mobile telephone whenever it is idle or on stand-by. However, if a message is received which would overfill the buffer, data is lost on a first-in-first-out basis.

It is an object of the invention to provide a more efficient and remotely reconfigurable SIM card.

From one aspect, the present invention consists in a telecommunications system comprising at least one host station and a plurality of subscriber units, the or each host station being operable to transmit a message to at least one of the subscriber units, and each subscriber unit having a multiplicity of fixed memory locations and means responsive to the detection of the message to store the message in a selected one of the fixed memory locations which can not be overwritten from the subscriber unit, but which can be accessed from the subscriber unit when required.

In this description and the accompanying claims, a "fixed" memory location means a location into which data can be written, and excludes first-in-first-out or circular buffers. Overwritting of all the data in certain "fixed" memory locations may occur in contrast to the first-in-first-out loss of data experienced with current SMS buffers.

Thus, for example, a set of telephone numbers, each with an identifying alphanumeric tag, can be transmitted to the SIM card, allowing users easy access to commonly used services such as hotels, car hire or airline reservations. This feature is known as a Value Added Service Directory.

A message may be retrievable by the subscriber on the entry of simple, short codes into the subscriber unit, each memory location corresponding to a particular code. A message may include a telephone number and, once stored, may be able to be overwritten over the air. Preferably, the or each host station is operable to transmit a request for information stored in a subscriber unit. The information may be included in a message and it may also include information which is stored in a secure memory location, accessible only when the subscriber enters a personal identification number (PIN number). The information may include credit details relevant to the subscriber, for example, a credit card number of credit status, thus greatly facilitating credit card transactions carried out over the telephone. Using this feature of the invention, a credit account holder avoids having to dictate his account details and need only enter the mandatory PIN number.

The host station may be operable to transmit instructions to lock and/or unlock a memory location at the subscriber unit. It may be operable to transmit instructions to run a program stored in memory locations at the subscriber unit. The host station may be operable to transmit files containing functional data and/or files containing non-functional data to the subscriber unit.

The messages, requests for information and the instructions being transmitted may be in a specific format which the subscriber unit is able to distinguish from other formats. The specific format may be made secure against interception.

In a preferred embodiment, the subscriber unit comprises a mobile radio or telephone and an integrated circuit card which can be removably connected to the radio/telephone. The integrated circuit card may contain the memory locations and may contain means for distinguishing the specific format from other formats. The card may contain means for distinguishing between the messages, requests for information and instructions. The card may also contain the means for storing the messages and means for acting on the requests and instructions.

From another aspect, the invention consists in a module for controlling a subscriber unit in a telecommunications system, comprising a multiplicity of fixed memory locations and means responsive to the detection of a message transmitted remotely thereto to store the message in a selected one of the fixed memory locations, and being adapted for removable connection to a transceiver of the subscriber unit.

At least one of the fixed memory locations may be protected from overwriting by the subscriber. The module or card may include means for rendering any or all of said fixed memory locations accessible or inaccessible by either the subscriber or the host station. The card may include a directory structure within which files can be stored.

The invention is particularly applicable to global telecommunication systems in which the mobile cellular telephone networks of various countries or areas communicate using a common standard. An example of such a global system is GSM (Global System for Mobile Communications) currently operating in Europe. However the invention is not limited to global systems and could be applied to a single national cellular network or even to a fixed land-linked network.

An embodiment of the invention will now be described by way of example with reference to the accompanying drawings in which:

FIG. 1 illustrates an SMS distribution path according to the invention. In the prior art, the short messages have usually been directed to a single subscriber or a specified group of subscribers such as a sales team.

Figure 1:
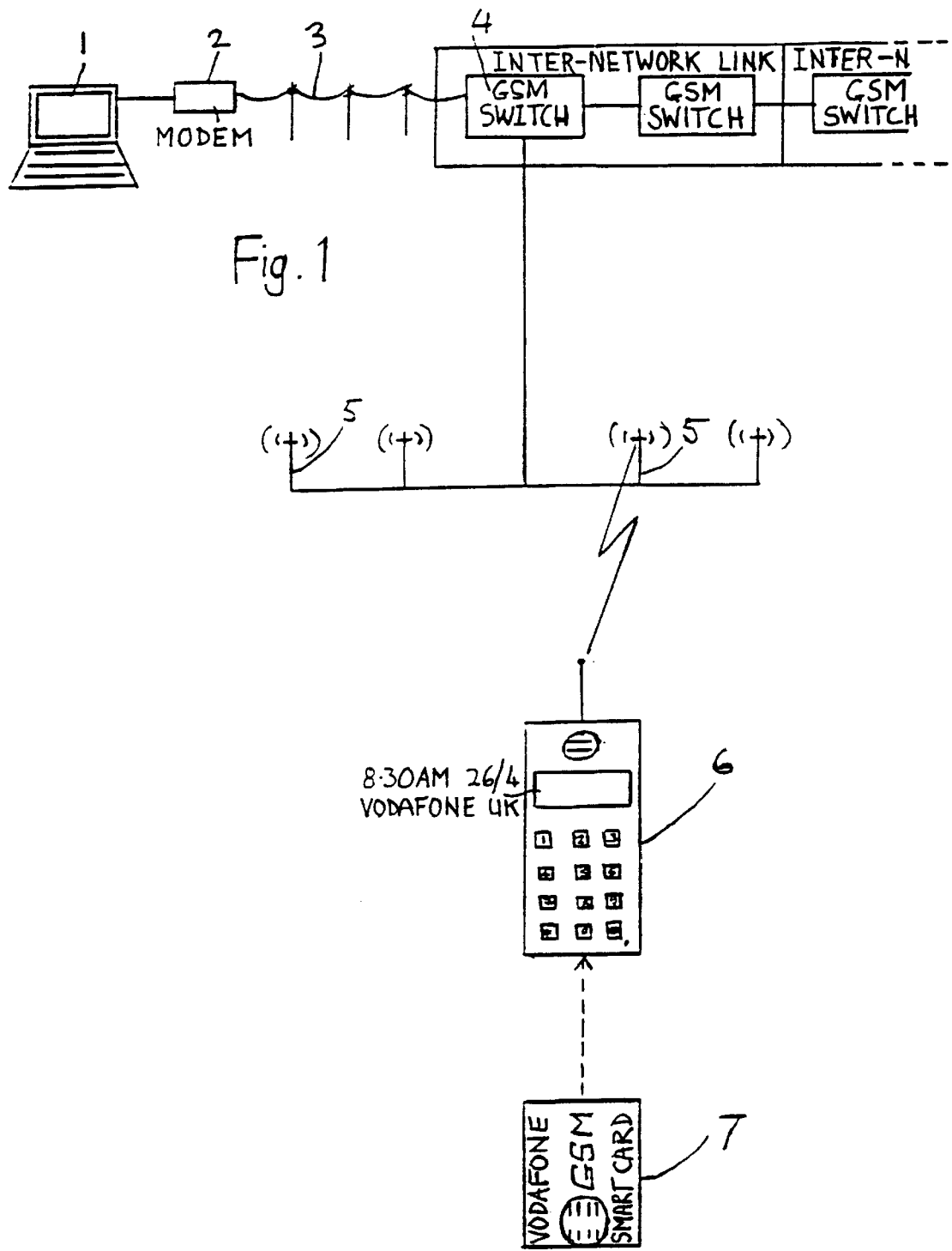
FIG. 1 shows the transmission of messages to a subscriber unit in a system according to the invention.

However, GSM also supports a feature known as Cell Broadcast in which messages can be sent to all the subscribers in a particular area. In the embodiment of the invention illustrated, a message consists of the telephone number of an advertiser and an alphanumeric tag to identify the advertiser.

An operator enters the message into a terminal 1. The message in then coded into a secure format known to applicants as an Embedded Command Stream (ECS) and sent via a modem 2 and a fixed line 3 to a local GSM switch 4. According to its delivery address, the message is delivered to any or all of the other switches within that network, or even across networks.

The switch 4, which in this example is in the geographical area to which the message is to be transmitted, delivers the message to a number of cellsites 5. The cellsites 5 are the base transceiver stations of the GSM network.

Each cellsite 5 then broadcasts the message to a group of transceivers or mobile telephones, hereinafter referred to as "mobiles". If Cell Broadcast is used, the group consists of all mobiles within the geographical area at the time of the broadcast.

A selected mobile 6 receiving the message transmits a confirmation of receipt back to its respective cellsite 5. From now on, until an update situation, the system will not contact this mobile 6 again.

The mobile 6 recognises the message as SMS data and passes it to a SIM card 7, which is a small self-contained microprocessor, held in a slot in the mobile 6. The SIM card 7 in turn recognises the ECS using special hardware and software and stores the message in memory in such a way that it may not be overwritten by the subscriber. Known SIM cards contain a large number of fixed memory locations in which the subscriber can store frequently dialled numbers and corresponding alphanumeric tags. The SIM card 7 of the invention stores the message in one of these locations, and then carries out a write protect operation. The locations dedicated to storing write protected messages may be designated by code numbers relating to a particular category of advertiser. Thus, for example, car hire company telephone numbers can be stored in location 01, hotel reservations in location 02 and so on.

Figure 2:
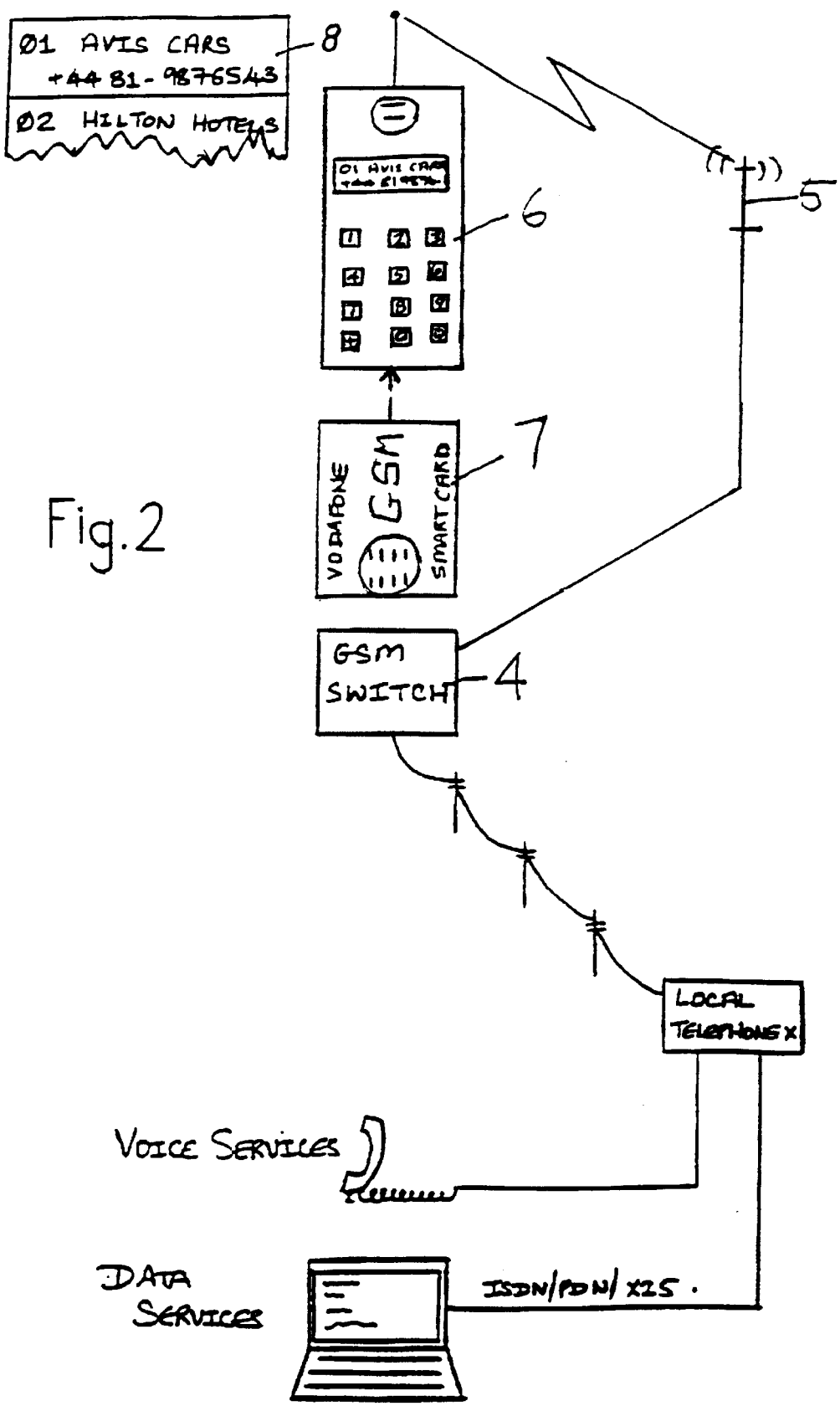
FIG. 2 shows a process in which a subscriber unit transmits a message and requested information.

FIG. 2 shows a call placing process in which a subscriber communicates with an advertiser. The subscriber, remembering that the car hire company's number is in location 01 as shown at 8, keys in a short code corresponding to the location, such as 01#. The mobile 6 then interrogates the SIM card 7 to retrieve the telephone number from the location. The SIM card 7 provides both the number and the alphanumeric tag giving the company's name and displays it to the subscriber. The user confirms that he wishes to proceed by pressing SEND.

Next, the mobile obtains a voice channel through which the call proceeds to the dialled number. The GSM system automatically handles intra-network and inter-network hops. At this point the subscriber can hold a voice conversation with the company.

Providing the correct equipment has been installed at the company, as soon as the call is answered, subscriber identity information read from the SIM card 7 gives the company immediate customer billing details such as a name and address.

The SIM card 7 also contains information detailing the subscriber's credit account. This information is held in a separate, secure memory location, accessible only when the subscriber enters a mandatory PIN number, known only to himself, thus confirming that the mobile has not been stolen or lost. When the subscriber has confirmed his car hire deal, he enters the PIN number into the mobile 6, requesting the credit information from the SIM card 7. The SIM card 7 supplies the information and the mobile uses existing voice/data techniques to transmit the information to the company, in a format secure against detection by fraudsters. The sale is confirmed by the company or its equipment and the call is terminated.

In this example, it is also possible to obtain a telephone or fax number from the operator-assisted directory enquiries system without the subscriber having to manually enter the number into the communications terminal which he desires to use.

To use this feature, the subscriber calls network directory enquiries and gives the name of the person, company or service of which he wishes to ascertain the telephone number, as well as any additional information requested by the operator answering the call. The operator then locates the number, confirms it and enquires as to whether the number is to be transmitted verbally, transferred over SMS into a given memory location of the subscriber's SIM card or both.

If the subscriber chooses a SIM update, the voice call is terminated and the operator initiates the SMS process by entering a sequence into a computer or pressing a dedicated button. The telephone number is then encoded into an ECS message at the despatch centre and is posted across the network to the subscriber's communications terminal, which transmits a confirmation to the despatch centre. Thus the retry mechanism, which operates until such a confirmation is received, is suspended.

The communications terminal recognises the message as SMS data, passes it to the SIM card, and if capable, displays a "message received" banner. The SIM card in turn recognises the ECS using special hardware and software, and decodes it accordingly. The number, and any associated alphanumeric tag, which would normally consist of the name of the person or company, are recovered together with the memory location in which they are intended to be stored. The number and name-tag are then written to that location and are write-protected if requested by the subscriber, the overwrite protection being encoded into the message at source.

Subsequently, the subscriber attempts to place a call to the number in the known memory location by keying in the memory location number. The SIM card passes the telephone or fax number to the communications terminal on demand, and upon receipt of the subscriber's confirmation, the communications terminal sets up the call to the desired number.

Figure 3:
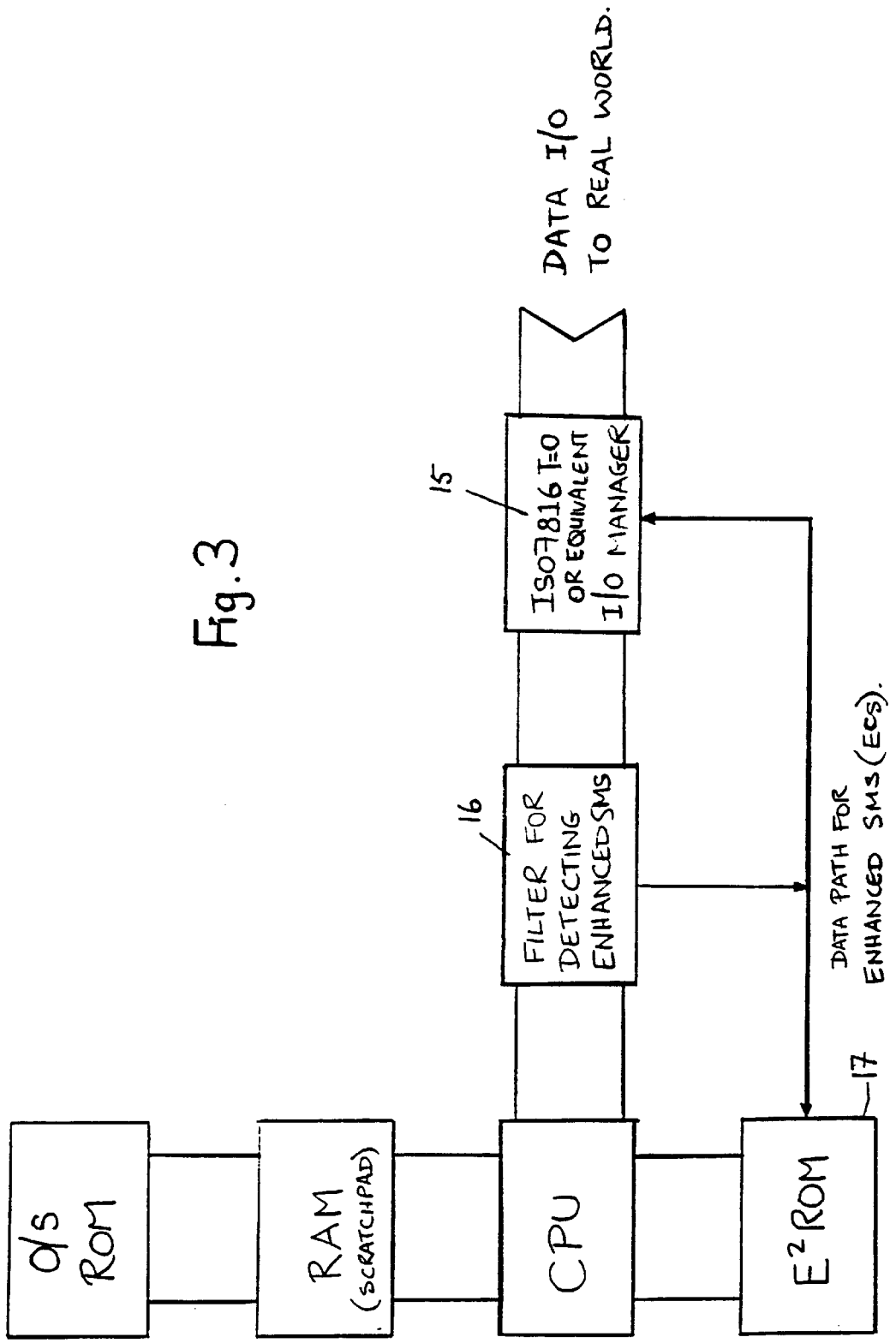
FIG. 3 is a block diagram showing elements of a module shown in FIGS. 1 and 2.

FIG. 3 shows the electronic structure of the SIM card 7. The card communicates with the mobile to which it is connected via an input/output (I/O) manager 15, preferably using the protocol ISO 7816 T=0. A filter 16 receives incoming data from the I/O manager and detects any ECS messages from among the short messages received. The ECS messages are sent directly to an extended erasable read only memory ($E^2ROM$) 17, which is preferably a "flash" $E^2ROM$. Data can also be output from the $E^2ROM$ directly to the I/O manager 15. The remaining blocks shown in FIG. 3 are standard components of a SIM card.

Figure 4:
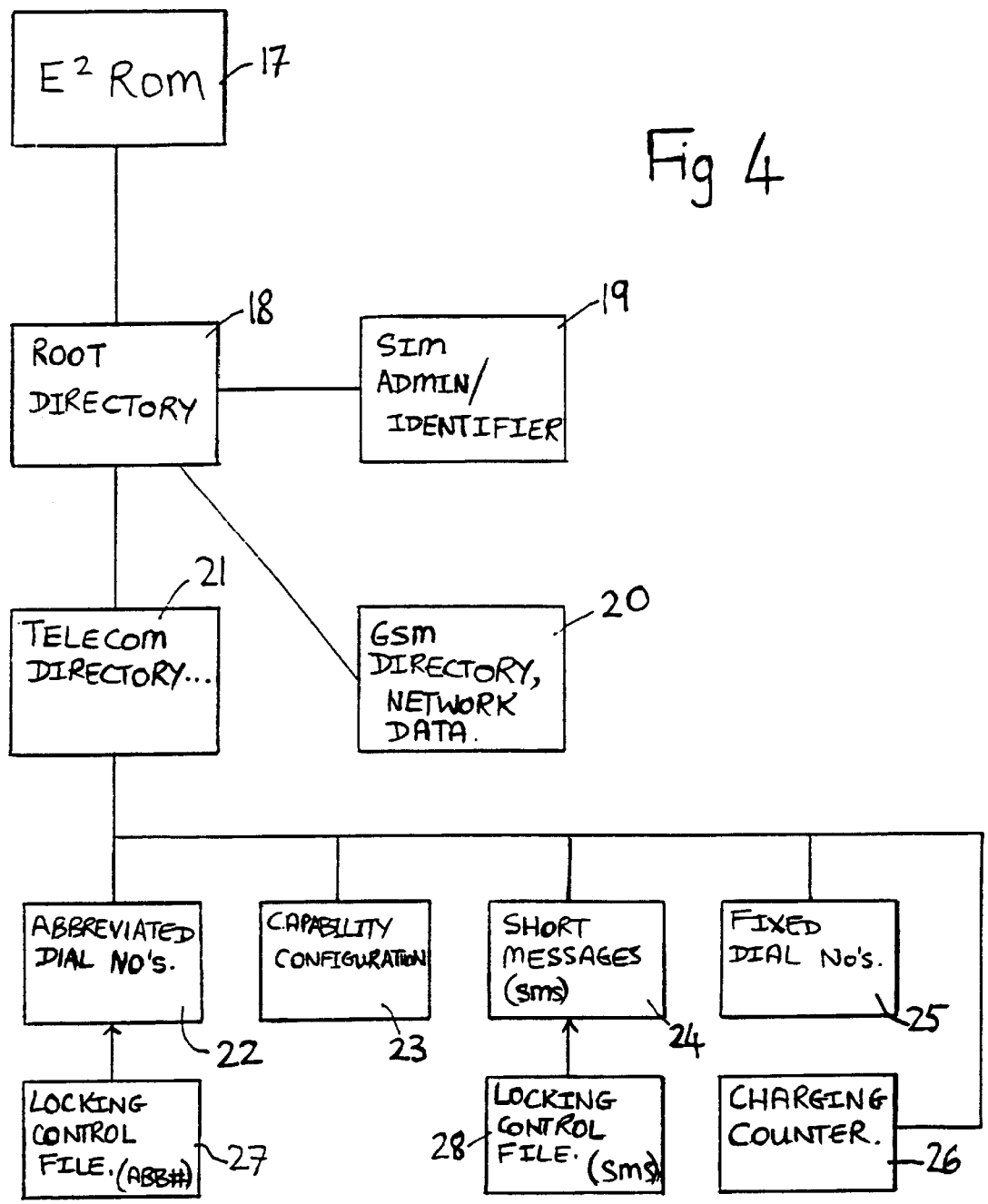
FIG. 4 shows details of one of the blocks shown in FIG. 3.

FIG. 4 shows how the $E^2ROM$ is organised. A root directory 18 contains a SIM administration and identifier 19, a GSM directory and network data 20, and a telecom directory 21.

The telecom directory in turn contains memory locations as follows: "abbreviated dial numbers" 22, "capability configuration" 23, "short messages" 24, "fixed dial numbers" 25, and "charging counter" 26. Each block represents a plurality of memory locations. The frequently dialled numbers and corresponding alphanumeric tags are stored at locations 22.

The "abbreviated dial numbers" locations 22 and the "short messages" locations 24 each have an associated locking control file 27, 28 respectively. The locking control files constitute means for read/write protecting and removing read/write protection from their associated memory locations. The locking control files 27, 28 will typically be in the telecom directory 21 as shown, however they can be located elsewhere such as in an administration directory.

Figure 5:
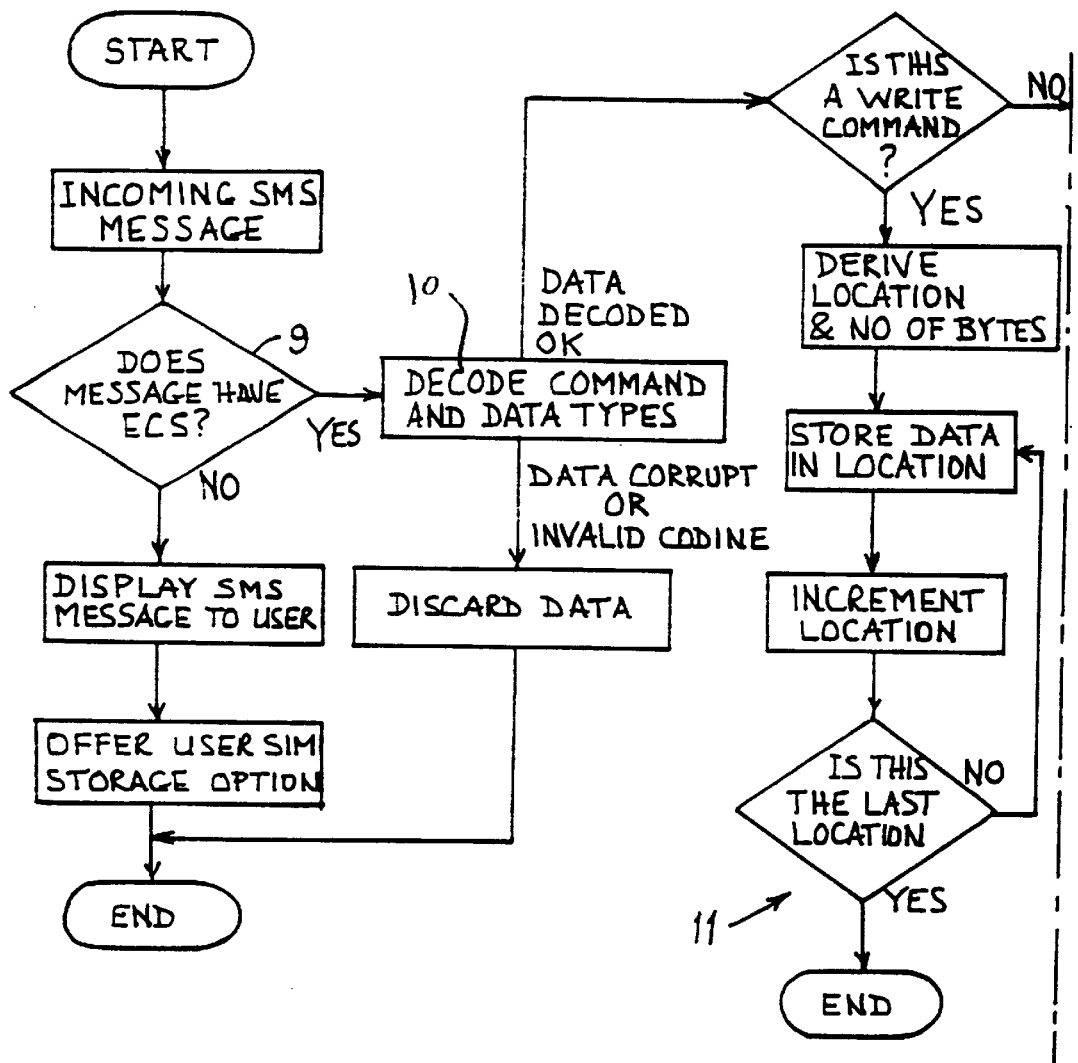
FIG. 5 is a flowchart showing the operation of the module shown in FIGS. 1 to 4.

FIG. 5 is a flowchart illustrating the operation of the SIM card 7, which uses the specially fabricated hardware and software which has been described above to implement the operations illustrated. At lozenge 9, messages, requests, and instructions having ECS are distinguished from those without. Each of these ECS types consists of a data stream headed by a command which is one of at least four types: write commands for the messages, read commands for the requests for information, attribute commands for lock or unlock instructions and run commands for instructions to run a program.

The command and data types are decoded at box 10 and acted on in one of the four paths 11–14.

Path 11 handles the write commands to store messages starting at a location specified therein. Path 12 handles the read commands; again, the requests for information contain a location to be accessed first. Successive locations are read and the data stored in a buffer until the required amount of data has been read. The data in the buffer is then encoded into the ECS format and despatched from the mobile using SMS to the calling party.

In path 13, attribute commands are used to lock or unlock specified memory locations and render them accessible or inaccessible, either to calling parties or to the subscriber. In path 14, run commands cause a program stored in the SIM card to be run.

The basic ECS system is expandable to up to 255 internal shell commands of which write, read, lock/unlock and run are four examples. The specific protocol used for the transfer of information is not fixed and could be ISO7816 T=0 or any other suitable protocol.

The internal shell commands are a supplement to the ability of the system to create external file objects within the SIM card 7. The file objects are of two types: Application Data File Programs (ADFP's) containing functional data which can be executed by the SIM card processor and can shelf modify if required and Application Data Files (ADF's) containing non-functional data which does not have these capabilities. Existing ADF(P)'s can be modified over-the-air enabling advanced facilities such as personalisation, re-personalisation or downloadable phone book.

The SIM card 7 has a directory structure, similar to that of a computer disk, and new ADF(P)'s can be downloaded into any directory over the air. Also over the air, directories can be created, deleted and modified, multiple tree directory operations can be carried out and ADF(P)'s that are no longer required can be deleted. The amount of ADF(P) data which can be downloaded is limited only by the size of the $E^2ROM$ memory of the card.

The invention, as described, greatly extends the applications of SIM cards. For example, using the Value Added Services Directory, subscribers can book hotels and airline seats over their mobiles quickly and easily.

An additional advantage of this feature of invention is that the geographical distribution of messages to cards in a specific area such as the South of France is facilitated. Thus advertisers can direct their messages to all mobile subscribers in the specific area. This is particularly useful when subscribers "roam" from one area to another and have no knowledge of local services.

The directory enquiries download enables contact telephone or fax numbers to be delivered to a subscriber's communications terminal without any intervention by the subscriber. The process of manually entering a number whilst engaged in a cell to the operator is often dangerous, especially when the subscriber is driving.

The ability of the system to download ADF(P)'s means that additional services can be added to the SIM card over the air while maintaining total compatibility with the existing cellular system. Thus the SIM card could acquire the functions of a credit card, passport, driving license, car park pass, member ship card and so on, becoming a multi-service card. Also, dynamically undatable services can be added which require a different process to be run each time a service is accessed.

Once the card has extra services on it, it can be used outside of the mobile phone environment if desired as a standalone item. This can be read from or written to by a dedicated piece of hardware, such as a point of sale machine. If desired, the new services can be deleted, however the card will never lose its mobile phone SIM capability. In addition, if the card has extra services, they will continue to function even if the subscriber has been disconnected from the mobile phone network, unless otherwise desired.

Modifications are possible without departing from the scope of the invention.

For example, the SIM card can be trained only to receive messages detailing services relevant to the subscriber's needs.

What is claimed is:

1. A method of operating a telecommunications system including at least one host station and a plurality of subscriber units, wherein said at least one host station is operable to transmit a first message to at least one selected said subscriber unit, said first message being adapted to be received and displayed at said least one subscriber unit and being transmitted as a first data stream in a predetermined format, and each of said subscriber units including memory locations for storing information, said method comprising the steps of:

transmitting a second message to at least one selected said subscriber unit, said second message containing information with respect to a party which may be selectively called from said at least one selected subscriber unit, and said second message being transmitted as a second data stream which is an encoded version of said predetermined format and comprises an embedded command stream in which said data stream has at least one embedded command which is a write command for storing said information in at least one selected said memory location of said at least one selected subscriber unit;

receiving said second message at said at least one selected subscriber unit;

determining when a message received at said at least one selected subscriber unit is a second message by detecting its format to be an embedded command stream;

routing said second message to decoding means;

decoding said second message;

storing said second message in said at least one memory location as identified in said second message;

fetching said information from said at least one memory location and displaying said information;

calling said party identified by said stored information from said at least one selected subscriber unit via a voice communication channel;

transmitting a third message from said party to said at least one selected subscriber unit in response to the establishment of said voice communication channel, said third message being transmitted as a third data stream which is in said encoded version of said predetermined format and comprises at least one embedded command which is a read command;

fetching data from at least one said memory location of said at least one selected subscriber unit as identified in said third message;

producing a fourth message representing said data; and transmitting said fourth message to said party, said fourth message being transmitted as a fourth data stream which is in said encoded version of said predetermined format.

2. A method of operating a telecommunications system including at least one host station and a plurality of subscriber units, said subscriber units including memory locations for storing information, wherein said at least one host station is operable to transmit a first message to at least one selected said subscriber unit using a short message service which transmits said first message coded in a predetermined short message service format, said first message being adapted to be received and displayed by said at least one selected subscriber unit, said method comprising the steps of:

encoding a second message to be transmitted to at least one selected said subscriber unit as an embedded command stream version of said short message service format;

transmitting said second message to said at least one selected subscriber unit;

receiving said second message at said at least one selected subscriber unit;

determining when a second message is received at said at least one selected subscriber unit by detecting said embedded command stream version of said short message service format;

routing said second message to decoding means;

decoding said second message;

processing said second message as dictated by at least one command included in said embedded command stream version of said second message;

requesting information stored in at least one of said memory locations of said at least one selected subscriber unit;

fetching said information in response to said request; and encoding and transmitting said information from said at least one selected subscriber unit as a third message, said third message being transmitted as an embedded command stream version of said short message service format.

3. In a telecommunications system comprising at least one host station and a plurality of subscriber units, wherein each said subscriber unit includes an integrated circuit module having memory locations for storing information, said at least one host station is operable to transmit a first message to at least one selected said subscriber unit for display by said at least one selected subscriber unit, said first message is transmittable via a short message service which uses a predetermined short message service format, and each said subscriber unit has means responsive to the detection of said first message to store said first message in at least one of said memory locations for fetching and displaying at said least one selected subscriber unit, when required, the improvement which permits said system to provide said subscriber units with value added services and which comprises:

said at least one host station being operable to transmit a second message to at least one selected said subscriber unit, said second message being encoded as an embedded command stream version of said predetermined short message service format;

each said subscriber unit having means for receiving said first and second messages, means for determining when a message is a second message by detecting said embedded command stream, means connected to said determining means for receiving and decoding said second message, means for processing said decoded second message as dictated by a command included in said embedded command stream, access means enabling said memory locations to be selectively accessed to fetch from at least one selected said memory location information stored therein, and means for encoding and transmitting said information fetched from said at least one selected memory location from said subscriber unit as a third message which is encoded as said embedded command stream version of said predetermined short message service format.

4. A method of operating a telecommunications system in which a host station is operable to transmit, to at least one of a plurality of subscriber units of the system, a first message coded in a predetermined first format which is adapted to be received and displayed by said at least one subscriber unit, and in which said subscriber units include memory locations for storing data, comprising the steps of:

coding a preselected second message in a second format distinguished from said first format, said second format comprising a data stream having an embedded command;

transmitting said coded second message from said host station to said at least one subscriber unit;

receiving said coded second message at said at least one subscriber unit, causing said at least one subscriber unit to distinguish said coded second message from said first message coded in said predetermined first format;

routing said second message coded in said second format to decoding means;

decoding said second message;

detecting when said decoded second message comprises an embedded command which is a write command;

writing data comprised in said second message into at least one of said memory locations, as identified by said second message, to store said data therein;

protecting said stored data from overwriting from said subscriber unit whilst permitting reading thereof from said subscriber unit;

accessing said at least one memory location so as to fetch therefrom data stored at said at least one memory location;

storing said data fetched from said at least one memory location in a buffer, encoding data stored in said buffer in said second format so as to produce a third message; and transmitting said third message.

5. A method of operating a telecommunications system including at least one host station and a plurality of subscriber units having memory locations for storing information, wherein said at least one host station is operable to transmit a first message to at least one selected said subscriber unit, said first message being transmitted as a first data stream in a predetermined format, said method comprising the steps of:

transmitting a second message to at least one selected said subscriber unit, said second message being transmitted as a second data stream which is an encoded version of said predetermined format and comprises a data stream having at least one embedded command;

receiving said second message at said at least one selected subscriber unit;

determining when a second message is received at said at least one selected subscriber unit by detecting said second data stream to be in said encoded version of said predetermined format;

routing said second message to decoding means;

decoding said second message;

detecting when said decoded second message includes an embedded command which is a read command requesting information stored in at least one said memory location of said at least one selected subscriber unit;

fetching said information from said at least one memory location as identified in said second message;

producing a third message corresponding to said information; and transmitting said third message, said third message being transmitted as a data stream which is in said encoded version of said predetermined format.

6. A method as claimed in claim 5, wherein said information is fetched from said at least one memory location in response to the entry in said at least one selected subscriber unit of a personal identification signal.

7. A method as claimed in claim 5, wherein said second message is transmitted in response to detection of a voice call from said at least one selected subscriber unit.

8. In a telecommunications system comprising at least one host station and a plurality of subscriber units, said at least one host station being operable to transmit a first message to at least one selected said subscriber unit for display by said at least one selected subscriber unit, said first message being transmitted as a data stream in a predetermined format, and each said subscriber unit having a multiplicity of memory locations and means responsive to the detection of said first message to store said first message in at least one of said memory locations for fetching and displaying at said at least one subscriber unit, when required, the improvement which permits said system to provide said subscriber units with value added services and which comprises;

said at least one host station being operable to transmit a second message to at least one selected said subscriber unit, said second message being encoded as an embedded command stream version of said predetermined format and comprising a data stream having at least one embedded command;

each said subscriber unit having means for receiving said first and second messages, means for determining when a message is a second message by detecting said embedded command stream, means connected to said determining means for receiving and decoding said second message, and means for processing said decoded second message as dictated by a command included in said embedded command stream, said memory locations of each said subscriber unit also being adapted to store information contained in said second message, if commanded, as well as other information; and said processing means including means for detecting when said decoded second message includes a write command, means for writing information comprised in said second message into at least one said memory location, as identified in said second message, to store said information therein, means for detecting when said decoded second message includes a read command requesting information stored in at least one said memory location of at least one selected said subscriber unit, as identified in said second message, and means responsive to said read command for fetching and encoding said information as a third message and for transmitting said third message from said subscriber unit, said third message being transmitted in said embedded command stream version of said predetermined format.

9. A telecommunications system as claimed in claim 8, wherein each subscriber unit includes access means enabling said memory locations to be selectively accessed to fetch from a selected said memory location information stored therein.

10. A telecommunications system as claimed in claim 9, wherein actuation of said access means to select said at least one memory location storing said information contained in said second message fetches said information and transmits the latter to display means of the subscriber unit for display thereon.

11. A telecommunications system as claimed in claim 9, wherein said memory locations include secure memory locations and said access means is only able to fetch information from a selected said secure memory location in response to entry of a personal identification signal into said subscriber unit.

12. A telecommunications system as claimed in claim 8, wherein each said subscriber unit includes means responsive to a personal identification signal entered at said subscriber unit for enabling said means for fetching, encoding and transmitting said third message.

13. A telecommunications system as claimed in 8, wherein the said memory locations, determining means, decoding means and processing means of each said subscriber unit are included in an integrated circuit module removably connected to said subscriber unit.

14. A telecommunications system as claimed in claim 8, wherein said predetermined format used for said first message is the format used for a short message service.

15. A telecommunications system as claimed in claim 8, wherein said second message includes executable applications data file programs for providing each said subscriber unit with additional services.

16. A telecommunications system as claimed in claim 8, wherein said processing means includes means for detecting when a decoded second message comprises an embedded command which is an execute command, and means for executing data stored in at least one said memory location.

17. A telecommunications system as claimed in claim 8, wherein said memory locations have file handling capabilities including directory functions.

18. A telecommunications system as claimed in claim 8, wherein said system is a global system for mobile communications.

19. A module for controlling a subscriber unit in a telecommunications system, said module comprising;

means for receiving from said subscriber unit first and second messages received by said subscriber unit, said first messages containing information to be displayed by said subscriber unit and comprising a first data stream in a predetermined format, and said second messages comprising a second data stream encoded as an embedded command stream version of said predetermined format;

a multiplicity of memory locations for storage of said information contained in said first messages, information contained in said second messages, if demanded, and other information;

means for distinguishing said first message from said second messages;

means connected to said distinguishing means for processing said first messages to permit display by said subscriber unit of the information comprising said first messages;

means connected to said distinguishing means for decoding messages distinguished as said second messages;

means for detecting when a decoded said second message includes an embedded command which is a read command requesting information stored in at least one of said memory locations, as identified by said second message; and means for fetching and encoding said information as a third message for onward transmission, said third message being encoded as a third data stream which is in said embedded command stream version of said predetermined format.

20. A module as claimed in claim 19, further comprising means responsive to a personal identification signal entered into said subscriber unit for enabling transmission of said information.

21. A module as claimed in claim 20, further comprising means responsive to a personal identification signal entered into said subscriber unit for enabling operation of the means for fetching and encoding said information as said third message.

22. A module as claimed in claim 19, further comprising means responsive to selective actuation of access means of the subscriber unit to fetch information stored in a selected said memory location and transmit said stored information for display by said subscriber unit on display means of said subscriber unit.

23. A module as claimed in claim 19, wherein said module is programmable for use remotely from said subscriber by downloading extra services onto said module via said at least one host station, prior to removing said module from said subscriber unit.

24. A module as claimed in claim 19, wherein said module is in the form of an integrated circuit card.

25. A module for controlling a subscriber unit in a telecommunications system, said module comprising;

means for receiving from said subscriber unit first and second messages received by said subscriber unit, said first messages containing information to be displayed by said subscriber unit and comprising a first data stream in a predetermined format of a short message service, and said second messages comprising a second data stream encoded as an embedded command stream version of the predetermined short message service format;

a multiplicity of memory locations for storage of said information contained in said first messages, information contained in said second messages, if demanded, and other information;

means for distinguishing said first messages from said second messages;

means connected to said distinguishing means for processing said first messages to permit display by said subscriber unit of the information comprising said first messages;

means connected to said distinguishing means for decoding messages distinguished as said second messages;

means for detecting when a decoded said second message includes an embedded command which is a read command requesting information stored in at least one of said memory locations, as identified by said second message; and means for fetching and encoding said information as a third message for onward transmission, said third message being encoded as a third data stream which is in said embedded command stream version of said predetermined short message service format.

26. A module as claimed in claim 25, wherein said module is a subscriber identity module.

27. A module for controlling a subscriber unit in a telecommunications system which is a global system for mobile communications, said module enabling said system to provide said subscriber unit with value added services, and said module comprising:

means for receiving from said subscriber unit first and second messages received by said subscriber unit, said first messages containing information to be displayed by said subscriber unit and being transmitted via a short message service in a predetermined short message service format, and said second messages being encoded as an embedded command stream version of said predetermined short message service format;

a multiplicity of memory locations for storage of said information contained in said first messages, information contained in said second messages, if demanded, and other information;

means for distinguishing said first messages from said second messages;

means connected to said distinguishing means for processing said first messages to permit display to said subscriber unit of the information comprising said first messages;

means connected to said distinguishing means for decoding messages distinguished as said second messages;

means for detecting when a decoded said second message includes an embedded command which is a read command requesting information stored in at least one of said memory locations, as identified by said second message; and means for fetching and encoding said information as a third message for onward transmission, said third message being encoded in said embedded command stream version of said predetermined short message service format.

28. A subscriber unit for a telecommunications system, said subscriber unit being adapted to display first messages transmitted to said subscriber unit via a short message service which uses a predetermined short message service format, said subscriber unit including a subscriber identity module releasably inserted therein and comprising:

means for receiving from said subscriber unit said first messages and second messages encoded as an embedded command stream version of said predetermined short message service format;

a multiplicity of memory locations for storage of said information contained in said first messages, information contained in said second messages, if demanded, and other information;

means for distinguishing said first messages from said second messages;

means connected to said distinguishing means for processing said first messages to permit display by said subscriber unit of the information comprising said first messages;

means connected to said distinguishing means for decoding messages distinguished as said second messages;

means for detecting when a decoded said second message includes an embedded command which is a read command requesting information stored in at least one of said memory locations, as identified by said second message; and means for fetching and encoding said information as a third message for onward transmission, said third message being encoded in said embedded command stream version of said predetermined short message service format.

29. A subscriber unit as claimed in claim 28, wherein said subscriber unit is a mobile telephone.

* * * * *